United States Patent
Jotz et al.

(10) Patent No.: US 10,343,249 B2
(45) Date of Patent: Jul. 9, 2019

(54) SHEET GLASS PRODUCT WITH INCREASED EDGE STRENGTH AND METHOD FOR PRODUCING SAME

(71) Applicant: SCHOTT AG, Mainz (DE)

(72) Inventors: Matthias Jotz, Alfeld (DE); Markus Heiss-Chouquet, Bischofsheim (DE); Hauke Esemann, Woerrstadt (DE); Clemens Ottermann, Hattersheim (DE); Claudia Stolz, Ingelheim (DE)

(73) Assignee: Schott AG, Mainz (DE)

( * ) Notice: Subject to any disclaimer, the term of this patent is extended or adjusted under 35 U.S.C. 154(b) by 138 days.

(21) Appl. No.: 15/494,215

(22) Filed: Apr. 21, 2017

(65) Prior Publication Data
US 2017/0304980 A1 Oct. 26, 2017

(30) Foreign Application Priority Data
Apr. 22, 2016 (DE) .................. 10 2016 107 535

(51) Int. Cl.
*B24B 9/10* (2006.01)
*C03C 19/00* (2006.01)

(52) U.S. Cl.
CPC ................ *B24B 9/10* (2013.01); *C03C 19/00* (2013.01)

(58) Field of Classification Search
CPC C03C 19/00; B24B 9/10; B24B 49/12; Y10T 428/24777; Y10T 428/315

USPC .......................................................... 428/192
See application file for complete search history.

(56) References Cited

U.S. PATENT DOCUMENTS

| | | |
|---|---|---|
| 2002/0032117 A1 | 3/2002 | Peuchert |
| 2011/0019123 A1 | 1/2011 | Prest |
| 2012/0052302 A1 | 3/2012 | Matusick |
| 2012/0329369 A1 | 12/2012 | Shimizu |
| 2013/0207058 A1 | 8/2013 | Wegener |
| 2013/0288010 A1 | 10/2013 | Akarapu |
| 2014/0065928 A1 | 3/2014 | Ko |
| 2015/0110991 A1 | 4/2015 | Miwa |

FOREIGN PATENT DOCUMENTS

| | | |
|---|---|---|
| WO | 2015072360 | 5/2015 |
| WO | 2015153251 | 10/2015 |

*Primary Examiner* — Catherine A. Simone
(74) *Attorney, Agent, or Firm* — Ohlandt, Greeley, Ruggiero & Perle, LLP

(57) ABSTRACT

Thin glass elements with improved edge strength are provided—from a sheet glass element that has two opposite parallel faces and an edge connecting the faces. The sheet glass element has a thickness of at most 700 μm. At least a portion of the edge is defined by an edge surface portion that is convexly curved, so that at least one of the faces merges into the edge surface portion, wherein a curved arc of the edge surface portion has a length that is at least 1/30 of the thickness of the sheet glass element. In the region of the convex curvature, the edge surface portion has indentations in the form of furrows.

11 Claims, 5 Drawing Sheets

SHEET GLASS PRODUCT WITH INCREASED EDGE STRENGTH AND METHOD FOR PRODUCING SAME

CROSS REFERENCE TO RELATED APPLICATIONS

This application claims the benefit under 35 U.S.C. 119 of German application No. 10 2016 107 535.3 filed on Apr. 22, 2016, the entire contents of which are incorporated herein by reference.

BACKGROUND

1. Field of the Invention

The invention generally relates to sheet-like glass elements. More particularly, the invention relates to the formation and processing of the edge of such glass elements.

2. Description of Related Art

With respect to failure under load, glass exhibits a different behavior than, for example, ductile materials. Such materials, in particular many metals, will stretch to its yield point under a bending or tensile stress and will then tear at a relatively well-defined load. By contrast, hard brittle materials will not break at a strength threshold in terms of a material characteristic, but randomly with a probability dependent on the applied tensile stress. The parameters of fracture probability distribution (e.g. normal or Weibull distribution) depend on the type of glass and on pre-existing damages and therefore in particular on the processing of the glass element.

If a sheet-like element made of glass is subjected to a bending load, a further effect is that the strength is decisively determined by the fracture strength of the edges of the element. Fractures occurring in a surface area are usually less frequent than fractures originating from one of the edges of the element. Therefore, the formation of the edge of a glass element is of particular importance.

Currently, very thin sheet glass articles are not processed at all at the edges, thicker glasses are either chamfered or processed with a C-cut at the edges, while no attention is paid to edge strength, but rather to so-called "chippings".

WO 2015/072360 A1 discloses a glass film laminate and the manufacturing of a liquid crystal display, in which a glass film is laminated to a glass support. The glass film is provided with a chamfer on the side facing away from the bonding to the support.

WO 2015/153251 A1 also describes the processing of a laminate. In this laminate, a thin glass is adhered to a substrate which may be a plastic substrate, for example. The laminate is severed, and the edge of the glass is processed abrasively and thereby beveled.

US 2014/065928 A relates to an edge grinding apparatus and a method for grinding a glass substrate. In particular, measures are provided in order to always remove a predetermined quantity of material during grinding, regardless of eventual misalignments or the size of the substrate.

US 2013/288010 A describes toughened glass panes with improved edge strength. The edge is produced by cutting and then grinding to a predetermined profile shape.

US 2012/329369 A contemplates processing of a substrate in which the substrate is adhered to a carrier substrate, an edge portion of the substrate is removed together with the adhesive, and then the non-adhered side of the substrate is processed.

US 2015/110991 A describes a glass laminate in which the two outer thin glass layers are beveled.

From US 2012/052302 A, a method is known for increasing the strength of the edges of a glass article in which the optical quality of the main surfaces or of coatings thereon is intended to be retained. A polymer protective layer is applied to at least one surface of the glass. The edge is then etched to reduce the number and size of defects at the edge.

US 2011/0019123 A1 relates to an apparatus and a method for improving the edge stability of a thin glass cover for an electronic device. The improvement is achieved by chemically toughening the edge and rounding it.

SUMMARY

The invention is based on the object of providing flexible glasses which exhibit merely a low fracture probability under the load envisaged during their use.

Accordingly, the invention provides a sheet glass element having two opposite parallel faces and an edge connecting the faces, wherein the sheet glass element has a thickness of at most 700 µm, preferably at most 300 µm, most preferably at most 200 µm, and wherein at least a portion of the edge is defined by an edge surface portion that is convexly curved, so that at least one of the faces merges into the edge surface portion, wherein a curved arc of the edge surface portion has a length that is at least 1/30, preferably at least 1/20, most preferably at least 1/10 of the thickness of the sheet glass element. In the region of the convex curvature, the edge surface portion has indentations in the form of furrows with a length greater than the width and depth thereof. Particular advantages are also achieved with even thinner glasses. Therefore, according to an embodiment of the invention, even thinner glasses are used, in particular glasses having a thickness of not more than 150 µm, or of not more than 100 micrometers, more particularly glasses with a thickness of at most 70 µm, at most 50 µm, or even at most 30 µm. Furthermore, for reasons of stability, specific minimum thicknesses are preferred. According to an embodiment of the invention, a minimum thickness of at least 2 µm, preferably at least 4 µm, most preferably at least 8 µm is contemplated as the minimum thickness.

Due to the numerous small furrows on the surface, existing or emerging cracks will influence each other, stress intensity at the ends of the cracks is reduced, and in this manner, surprisingly, overall strength increases.

First, with the thickness of the glass element of 700 µm or less corresponding to the above-mentioned preferred glass thicknesses, low stiffness is provided. With the special formation of the edge, this glass element is then furthermore well protected against fracture, even under a bending load, so that in the bent state low fracture probability and a long service life are provided.

For manufacturing the article according to the invention, a method is provided for processing glasses, which comprises the steps of: providing a sheet glass element having a thickness of not more than 700 micrometers or a thickness between the aforementioned upper and lower limits of 300 µm and 2 µm; processing at least one edge of the sheet glass element in a manner so as to produce at that edge an edge surface portion that is convexly curved, so that at least one of the faces merges into the edge surface portion, wherein the curved arc of the edge surface portion has a length that is at least 1/30, preferably at least 1/20, most preferably at least 1/10 of the thickness of the sheet glass element; wherein the processing is performed using at least one abrasive tool moving relative to the edge and having an undefined cutting edge; and wherein with the processing the radius of curvature is increased and indentations in the form of furrows are introduced into the edge surface portion, which have a length that is greater than the width and depth thereof.

The depth of the furrows is in particular at least 10 nm and at most 5 µm, preferably at most 2 µm, most preferably at most 1 µm. For introducing these furrows, an appropriate abrasive tool with a suitable grain size of the abrasive medium is selected.

The convexly shaped edge surface portion may be associated with a radius of curvature that is defined as the radius of a circle fitted to the starting, halfway, and end points of the curved arc. According to a preferred embodiment of the invention, this radius is at least 1/40, preferably at least 1/30, most preferably at least 1/20 of the thickness of the sheet glass element. The curvature is well characterized by such a radius especially in case of cylindrically curved surfaces. For the stability of the sheet glass element, even larger radii are favorable. Therefore, according to yet a further embodiment of the invention a radius of the fitted circle of at least 1/10, preferably at least 1/5, in particular at least half of the thickness of the sheet glass element is suggested. The radius may even be greater than the thickness of the glass.

If the edge surface portion adjoins another surface portion and at the transition the radius of curvature is smaller than suggested according to the invention, it is contemplated according to a refinement of the invention that between the edge surface portion and a surface portion of the sheet glass element adjacent to the edge surface portion an angle between the tangents to the two surface portions is at most 45°, preferably at most 20°, more preferably at most 10°. Due to the smaller edge radius at this point, an edge line is defined along which the inclination of the adjacent surface portions changes more or less abruptly.

In order to obtain the rounded shape of the edge surface portion, it is favorable to employ a supple polishing tool as the abrasive tool, which conforms to the contour of the edge.

The machining may be performed in multiple steps, in particular with successively finer grain of the abrasive medium.

It has furthermore proved to be very favorable to use an abrasive tool which exhibits a certain elasticity. In particular it is contemplated according to one embodiment of the invention that the abrasive tool has a modulus of elasticity of less than 10 GPa.

Particularly advantageously abrasion is achieved using a rotating abrasive tool, in particular including a rotating polishing tool. The abrasive tool may be employed both with an end face as well as with a lateral or circumferential surface thereof as the abrasive surface. The end face is the surface of a cylinder or of a cone which is pierced by the rotational axis. The tangential velocity of the abrasive surface varies depending on the distance from the axis of rotation. In case of a lateral or circumferential surface as the abrasive surface, the distance substantially remains the same in the region of contact to the glass element. Accordingly, the tangential velocity varies only slightly. A conical lateral surface of a conical or frustoconical abrasive tool is also conceivable. On such a surface, the tangential velocity will also vary, but not as strongly as on an end face. According to one embodiment of the invention, an abrasive tool adapted to the final shape of the edge may be used as well. The abrasive medium may be bonded to the abrasive tool. Alternatively or additionally, an abrasive medium may be applied to the glass and/or to the abrasive tool. An example of this is a polishing paste.

In order to interrupt crack propagation in the event of a bending load, it is furthermore advantageous if the furrows run obliquely or perpendicularly to each other in different directions. In particular it is possible for the furrows that run obliquely or perpendicular to each other to intersect in this case.

BRIEF DESCRIPTION OF THE DRAWINGS

The invention will now be described in more detail with reference to the drawings in which the same reference numerals designate the same or equivalent elements. In the drawings.

DETAILED DESCRIPTION

Figure 1:
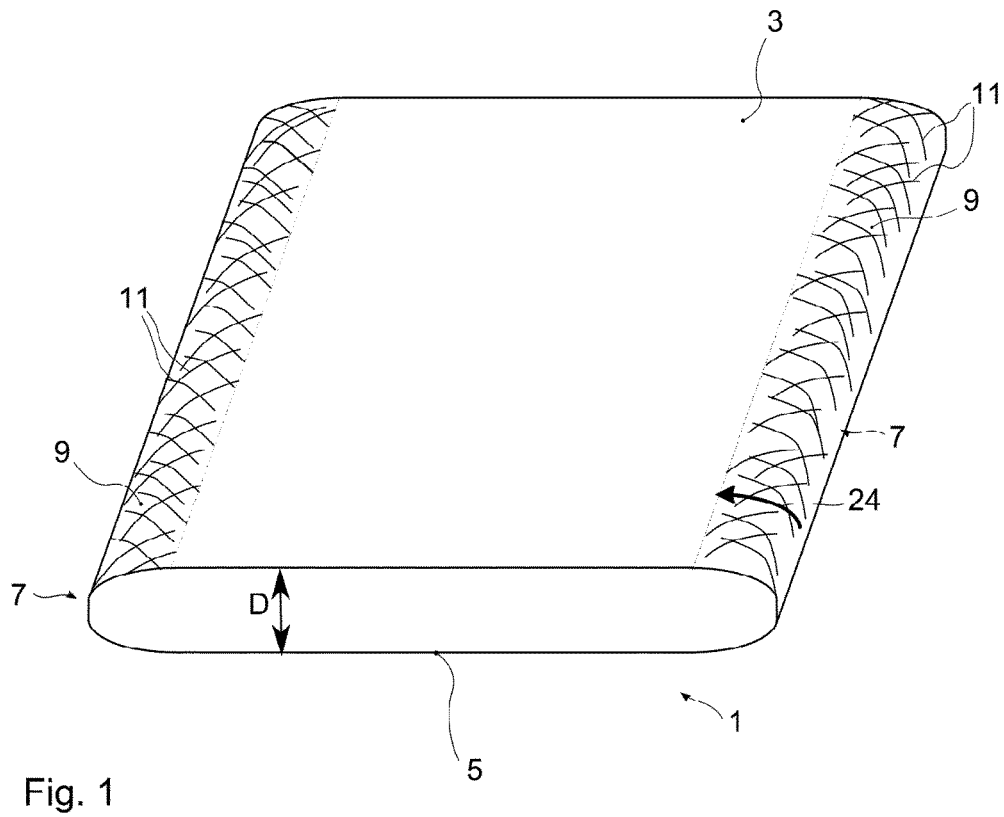
FIG. 1 shows a sheet glass element.

FIG. 1 is a perspective view of a sheet glass element 1 according to the invention. Sheet glass element 1 has two opposite faces 3, 5, in particular in parallel to each other. The thickness D of sheet glass element 1 is defined by the spacing between the two faces 3, 5 and is less than 700 micrometers, preferably 300 micrometers, more preferably at most 200 micrometers, most preferably not more than 150 micrometers. Even smaller thicknesses of not more than 100 micrometers, especially with a thickness of at most 70 µm, at most 50 µm, or even only at most 30 µm are also possible.

The portions of the peripheral edge 7 shown on the right and on the left in the view have been formed according to the invention. These portions include an edge surface portion 9 which is convexly curved. The length of the curved arc of edge surface portion 9 along the path from one face 3 to the other, opposite face 5 in the direction perpendicular to the longitudinal extension of edge 7 is at least 1/30, preferably at least 1/20, most preferably at least 1/10 of the thickness D of the element 1. The corresponding curved arc 24 of a convexly curved edge surface portion 9 is indicated in FIG. 1.

Furthermore, as shown in FIG. 1, the edge surface portion 9 has indentations in the form of furrows 11 where it is convexly curved. Furrows 11 only have a small depth. This is sufficient to be effective against crack propagation. Anyhow, it is contemplated according to the invention that the length of the furrows is greater than the width and depth thereof. In the figure, imaginary, not actually existing separating lines are indicated where the edge surface portions 9 merge into the face 3.

According to an embodiment which is also implemented in the exemplary embodiment shown in FIG. 1, the furrows extend in multiple directions. This implies that the furrows of different orientations extend obliquely relative to each other. In case of a sufficient length and density of the furrows 11, as in the illustrated example, the furrows intersect each other. This is favorable, since in this manner a starting crack will run into a furrow with a high probability, even if its initial orientation is in parallel to another furrow 11. The distribution of the orientations may include one or more preferred orientations. A preferred orientation may be favorable for suppressing the formation of cracks that also preferably extend in a specific direction. According to one embodiment of the invention, the furrows have a preferred orientation along the longitudinal extension of the edge.

Figure 2:
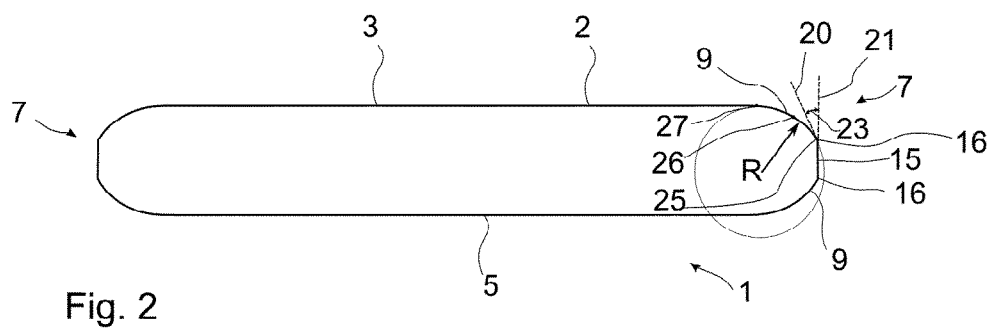
FIG. 2 is a cross-sectional view of a sheet glass element according to a further embodiment of the invention.

It is particularly desirable to avoid any edge lines at the edge 7 of the sheet glass element, since such edge lines which result from a discontinuous change in the inclination of the surface and thus define corners in the cross section, are more susceptible to defects and form weak points. However, such an edge line may optionally be provided or may even be desirable for other reasons. This may be the case, for example, if a flat surface area is desired at the edge, which is bounded by such an edge line at which the inclination of the adjoining surfaces changes discontinuously. Such a surface may be desirable for fixing the element, for example. FIG. 2 shows an example of an embodiment with an edge line in a cross-sectional view. Specifically, in this case, the edge 7 is formed by two convexly curved edge surface portions 9 between which a further surface portion 15 extends. The junction of this surface portion 15 to the adjacent surface portions 9 of edge 7 is at edge lines 16. It is now contemplated according to an embodiment of the invention that the angle between the tangents 20, 21 to edge surface portion 9 and surface portion 15 of the surface 2 of the sheet glass element 1 is at most 45°, preferably at most 20°, more preferably at most 10°. Here, the tangents 20, 21 are fitted to the surface portions perpendicularly to the direction of curvature of the curvature of edge surface portion 9. With this definition, the tangents 20, 21 moreover lie in a plane perpendicular to the edge line 16.

The convexly curved edge surface portions 9 may further be associated with a radius of curvature that is defined by a circle fitted to three points of the arc 24, as shown in FIG. 2, namely a starting point 25, an end point 27, and the halfway point 26 of the arc. In the example of FIG. 2, a radius of curvature results which is more than half the thickness D of the sheet glass element 1.

The examples of FIGS. 1 and 2 are implementations of a particularly preferred embodiment of the edge 7 of a sheet glass element 1. Basically, in this embodiment of the invention, the edge 7 comprises two convexly curved edge surface portions 9 each of which merges into a respective one of faces 3, 5, and between the edge surface portions 9 there is a further surface portion 15 of edge 7 extending therebetween, which is rectilinear in cross section, as shown in FIG. 2. In case of a straight edge 7, this surface portion 15 is planar. Preferably, the surface thereof extends perpendicular to faces 3, 5.

Figure 3:
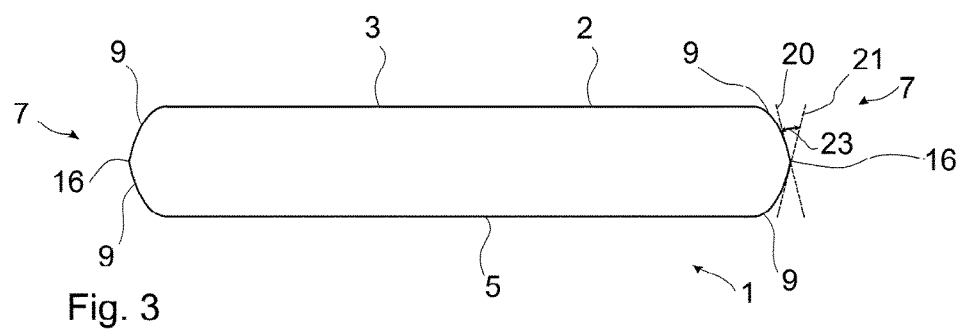
FIG. 3 shows a variant of the example shown in FIG. 2.

Other than illustrated in the example of FIG. 2, the further surface portion 15 may be one of the faces 3, 5 as well, i.e. not necessarily part of the edge. Also, the adjacent surface portion 15 may be identical to a further convexly curved edge surface portion 9. Such an example is shown by the variant of FIG. 3. Here, two edge surface portions 9 of edge 7 are intersecting, so that at the edge line 16 the tangents 20, 21 thereto define a small angle 23 of less than 45°.

Figures 4, 5, 6:
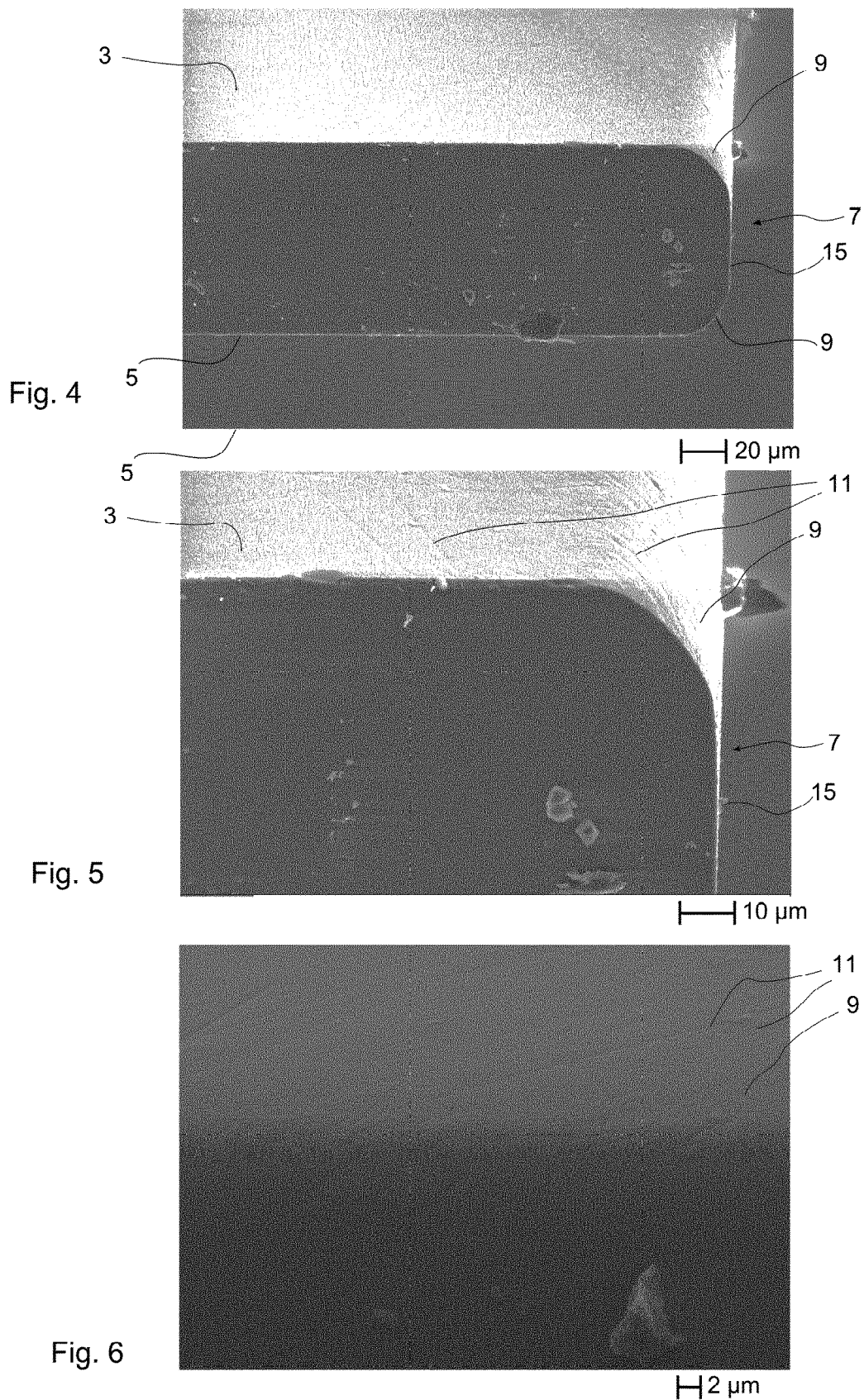
FIGS. 4 to 6 show electron micrographs of the edge of a glass element, in different magnifications.

FIGS. 4 to 6 show electron micrographs of a sheet glass element 1 processed according to the invention, in increasing magnification. The sheet glass element 1 of this example has a thickness of about 100 micrometers. Edge 7 has a convexly curved edge surface portion 9 adjacent to each of faces 3, 5. Like in the example shown in FIG. 1, a further, preferably non-curved surface portion 15 extends between these two edge surface portions 9, as part of the edge 7. Edge surface portions 9 have a substantially circular curvature, with a radius of curvature that is about a quarter of the thickness of the sheet glass element 1. FIG. 6 shows a top view of one of the edge surface portions 9.

Furrows 11 can clearly be seen in FIGS. 5 and 6. Furrows 11 are elongated, thus they have a length that clearly exceeds the width and depth thereof. Furthermore, it can be seen that furrows 11 run obliquely to one another in different directions and in part intersect each other. In the present example, the orientation of furrows 11 is more or less random due to the processing with the abrasive tool. In FIG. 6, however, many furrows 11 extend diagonally from the lower left to the upper right, so that a certain preferred orientation is given in the distribution of orientations.

The depth of the furrows exceeds a value of 10 nanometers on average, but does not exceed a depth of 5 µm, nor a depth of 500 nm in particular. This is favorable for retaining a smooth surface which is less susceptible to defects, but which, on the other hand, can already stop crack propagation at the furrows.

The method for producing the sheet glass element 1 will now be described in more detail below.

The edge 7 formed according to the invention can be produced by mechanical abrasion, in particular by an abrasion method using a tool with a geometrically undefined cutting edge, such as by grinding and/or polishing and/or lapping, from any initial geometry exhibiting a smaller edge radius. Abrasion using a tool with a geometrically undefined cutting edge refers to a method according to this classification in the sense of DIN 8589.

Figure 7:
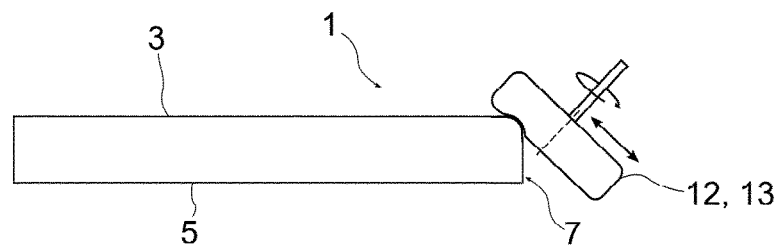
FIG. 7 shows the processing of an edge of the sheet glass element with an abrasive tool.

FIG. 7 shows the processing of an edge 7 of a sheet glass element 1 using an abrasive tool 12. Abrasive tool 12 comprises a rotating grinding body 13. Abrasive tool 12 processes the edge 7 of sheet glass element 1 in a manner so that the radius of curvature at edge 7 is increased and a convexly curved edge surface portion 9 is produced so that at least one of faces 3, 5 merges into the edge surface portion 9. Processing continues until the convex envelope of edge surface portion 9 has a minimum radius of curvature which is at least ¹⁄₄₀ of the thickness of the sheet glass element. The grinding or polishing process simultaneously introduces the indentations in the form of furrows 11 into the edge surface portion 9.

Advantageously, as illustrated in FIG. 7, the abrasive tool is so supple that it conforms to the edge 7. Furthermore advantageously, the abrasive tool is designed so that a higher contact pressure and the same relative movement results in an increased abrasion of glass. This, in conjunction with the conforming abrasive tool, contributes to the increase of the radius of curvature at edge 7.

According to one embodiment of the method, the polishing tool is applied against edge 7 at an angle between 0 and 90° relative to the face 3, 5 of the glass and is moved accordingly. In addition to a rotating movement and a longitudinal movement along edge 7, the abrasive tool 12 may furthermore be moved transversely, as indicated by the double arrow in FIG. 7. The geometry of the abrasive body 13 is preferably such that in this step the edge 7 of the glass presses more strongly into the polishing tool than the regions adjacent thereto.

With the stronger pressure and given a constant modulus of elasticity of the abrasive body, a stronger force is applied at the edge resulting in increased abrasion there. Thus, an edge according to the invention can be formed by suitably selecting the engagement angle, the processing time, further processing parameters, tool material, and tool geometry.

The machining process may be executed in one or more process steps. In case of multiple process steps, it is possible for the different process steps to change the grinding/polishing/lapping tools, abrasive media, such as the employed polishing pastes on the one hand, but also the process parameters (contact force, rotational speed, engagement angle, additives, . . . ). Such process parameters may as well be modified during a single process step. In particular the engagement angle may be varied continuously.

The abrasive tool 12, or its grinding body 13, has some properties which may advantageously be selected within certain limits.

Elasticity: Preferably a grinding body 13 is selected which has a modulus of elasticity (mean modulus of elasticity in the case of composites) of less than 10 GPa.

Grain sizes: The grain sizes are advantageously selected so that the above-mentioned dimensions of the furrows 11 can be achieved. These may be different depending on the grain material. Preferably, at least a grain size of more than grade 180 (classification according to the Association of Manufacturers of Abrasive Products) is used.

Grain material is suitably selected: It can be assumed here that the grain material is harder than the glass to be processed. Preferred materials are diamond, cerium oxide, corundum, zirconium oxide, cubic boron nitride. The grains employed for abrasion may firmly be bonded to or may be added or applied to the grinding body 13 or the glass in the form of pastes, liquids, or the like. However, in the case of not firmly bonded grain it has to be considered that the prerequisite that a higher contact pressure leads to increased abrasion is not necessarily given or might be attenuated because the grains are possibly moved out of the contact pressure zone. More generally, without being limited to the specific exemplary embodiments, it is therefore contemplated according to an embodiment of the method that the edge 7 is processed with an abrasive tool 12 which generates increased abrasion with increasing contact pressure against the surface 2 of the sheet glass element 1.

Sheet glass element 1 is preferably fixed to a solid support in such a way that it does not bend excessively under the required load, so that breakage or undesirable polishing effects due to deflection are avoided. However, with appropriate machining parameters, free machining without a support is conceivable as well.

Figure 8:
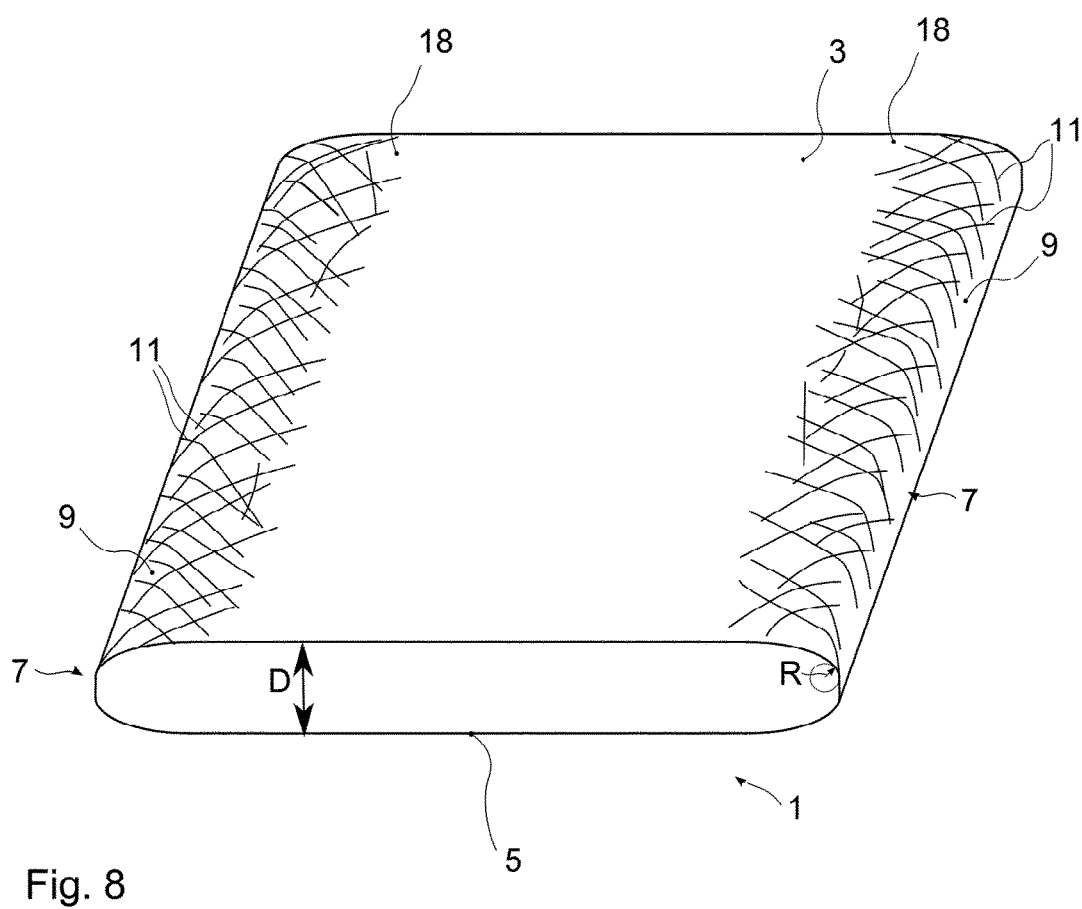
FIG. 8 shows a variant of the example of FIG. 1, with furrows in an area of the faces.

The micrograph of FIG. 5 illustrates yet another effect. On closer examination, it can be seen that furrows 11 are also existing on faces 3, 5 that are parallel to each other in the surface area adjoining the convexly curved edge surface portion. Therefore, according to one embodiment, edge-side strips of faces 3, 5 also have furrows 11 with the aforementioned geometry. This may be particularly advantageous in order to suppress crack propagation in the region close to the edge. FIG. 8 schematically illustrates an implementation example of this embodiment, as a refinement of FIG. 1. As can be seen from the illustration, each of the convexly curved edge surface portions 9 merges into a respective face 3, 5, and areas 18 of faces 3, 5 adjoining the edge face portions 9 also have furrows 11. It is in particular also possible that furrows 11 extend from the convexly curved edge surface portion 9 into the adjacent area 18 of faces 3, 5. In the figure, imaginary, not actually existing separating lines are indicated to illustrate the position and extension of the areas discussed above.

The invention is applicable to a variety of glasses. However, preference is given to those glasses which are readily processable into thin films and which still exhibit high strength in the case of the intended thin glass thicknesses.

If the employed glass is an alkali-containing glass, chemical toughening of the sheet glass element 1 is additionally conceivable according to one embodiment of the invention. Chemical toughening may be accomplished prior to and/or following the edge processing. According to a particular embodiment of the invention, chemical toughening is performed after edge processing so that an ion exchange zone is formed at the edge, which extends along the convexly curved edge surface portion 9 and is also curved correspondingly. The special edge shape helps to preserve the increased strength caused by the chemical toughening even at the edge of the element.

Advantageously, a low-iron or iron-free glass may be used, in particular with an $Fe_2O_3$ content of less than 0.05 wt.-%, preferably less than 0.03 wt.-%, since this glass exhibits reduced absorbance and thus in particular allows for increased transparency.

However, preferred glasses for other applications additionally include gray glasses or colored glasses.

According to one embodiment, a glass or a glass ceramic is used that has been toughened or can be toughened for its use. This glass or glass ceramic can be toughened chemically by ion exchange, or thermally, or by a combination of chemical and thermal toughening.

An optical glass may as well be used as a glass material, such as for example a heavy flint glass, lanthanum heavy flint glass, flint glass, light flint glass, crown glass, borosilicate crown glass, barium crown glass, heavy crown glass, or fluorine crown glass.

Advantageously, a low-iron or iron-free glass may be used, in particular with an $Fe_2O_3$ content of less than 0.05 wt.-%, preferably less than 0.03 wt.-%, since this glass exhibits reduced absorbance and thus in particular allows for increased transparency.

However, preferred glasses for other applications additionally include gray glasses or colored glasses.

The invention is particularly suited for optimizing the mechanical properties of glasses that already exhibit high strength. High-strength glasses are typically used for applications in which the glasses are actually subjected to high mechanical stress. Therefore, such glasses are designed so as to resist bending stresses acting on the surface area. Explicitly in this case the edges of the glasses represent the major weaknesses. Ultimately, a glass sheet made of high-strength glass will break very quickly if the edge of the sheet has defects and is also subjected to bending stress. The invention now permits to verify whether the edges consistently keep their quality, for example when individual glass sheets are cut to their final size by severing a larger glass sheet. For example, it might happen that a scoring wheel leaves damage to the glass edges as a result of wear. If this happens, the strength of the entire glass sheet would be considerably reduced.

Figure 9:
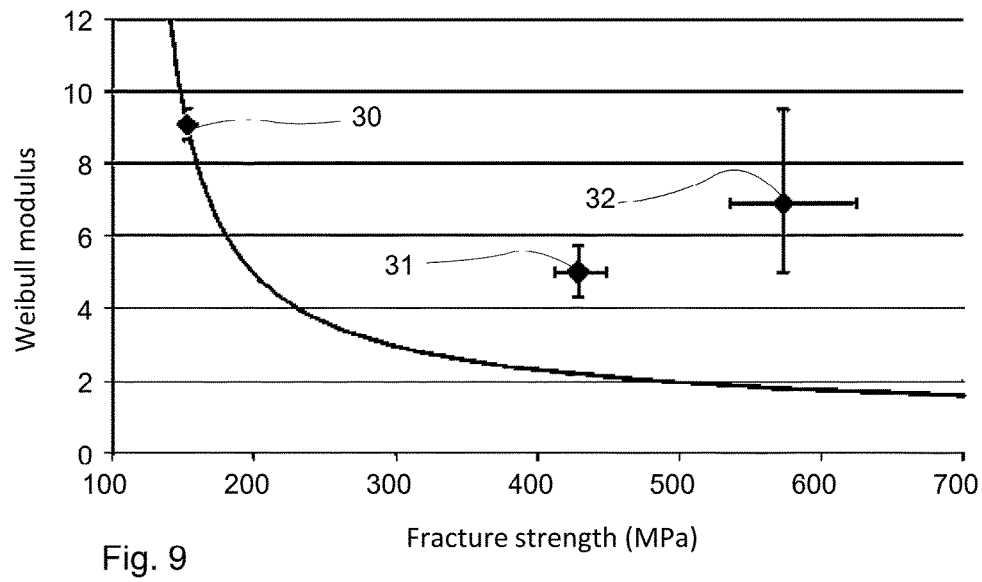
FIG. 9 is a diagram with measurement points of fracture strength and Weibull modulus of glass samples with differently processed edges.

With the invention, by contrast, it was possible to achieve very high strengths of thin glasses. For example, a strength of more than 500 MPa and at the same time a high Weibull modulus were measured on an aluminosilicate sheet glass element. An example for this will be explained with reference to FIGS. 9 to 12. FIG. 9 shows a diagram with three measurement points of fracture strength and Weibull modulus. The three measurement points 30, 31, 32 represent the strengths of glass elements with differently processed edges. The glass elements differ only in terms of edge processing.

The composition of the glass (an aluminosilicate glass) and the thickness of the glass elements (100 μm) is the same.

Figure 10:
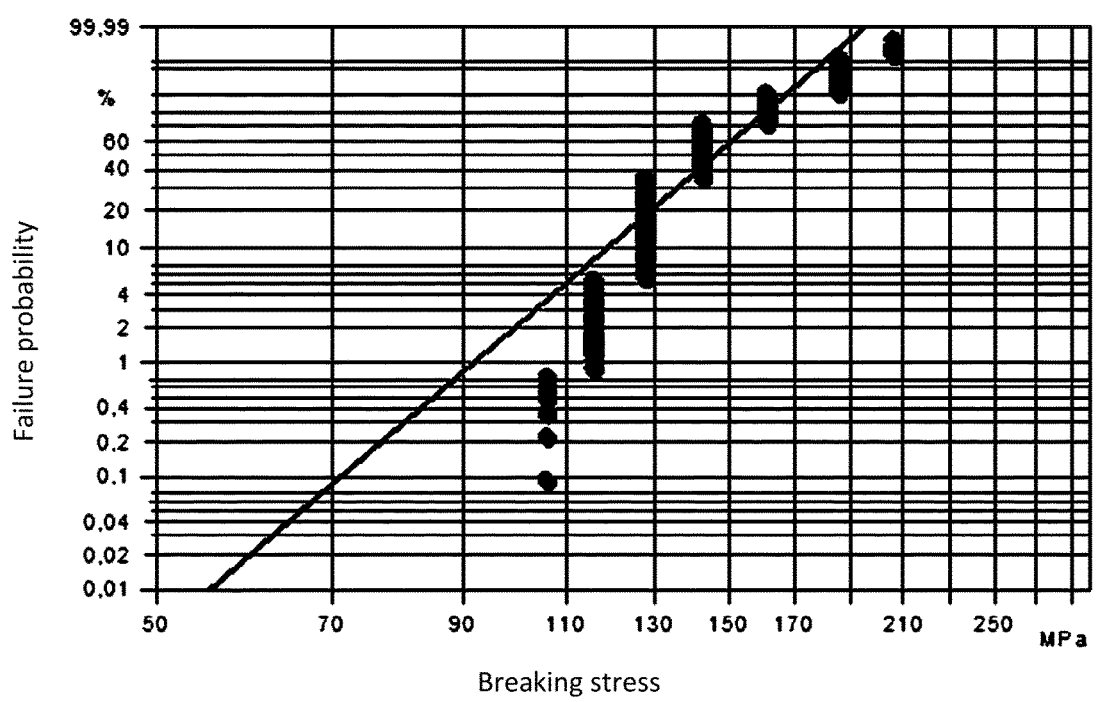
FIGS. 10 to 12 show associated Weibull diagrams with regression lines.

The measurement points shown in FIG. 9 are resulting from the slope and position of the regression lines of the associated Weibull diagrams. The Weibull diagrams with the regression lines associated with the measurement points 30, 31, 32 are shown in FIGS. 10, 11, 12.

First of all, it can be seen from the measurement points that the formation of the edges has a great influence on the strength. Measurement point 30 was determined from the fracture tests illustrated in FIG. 10 as a Weibull diagram. The samples are glass elements with edges produced by score-and-break separation. A value of T=152.7 MPa is resulting for the average fracture strength. Weibull modulus is b=9.09. In FIG. 9, a curve is drawn through this measurement point 30. This curve is defined by all straight lines having a 5% fractile equal to that of measurement point 30. Measurement points lying on this curve thus belong to glass elements of comparable strength.

Figure 11:
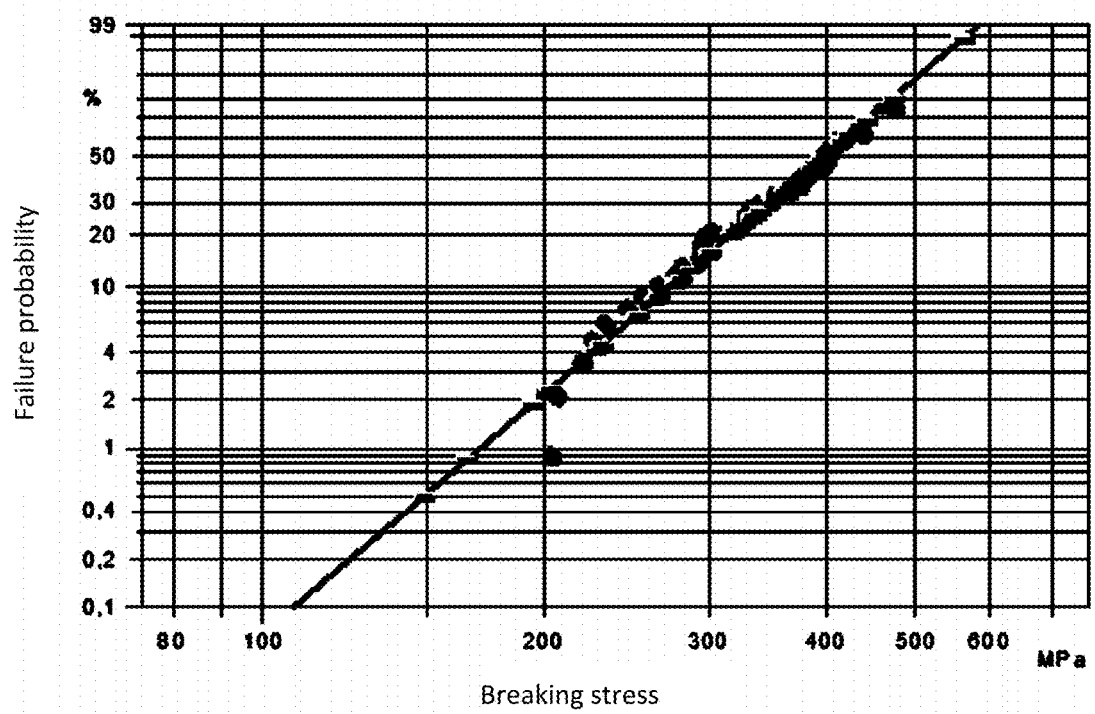

Measurement point 31 in FIG. 9 with an average fracture strength of 428.6 MPa and a Weibull modulus of b=5.0 was determined from the regression line shown in FIG. 11. The measurement points of the Weibull diagram of FIG. 11 were measured on glass samples with edges cut by laser. Separation, or creation of the edges, was performed using a $CO_2$ laser.

Figure 12:
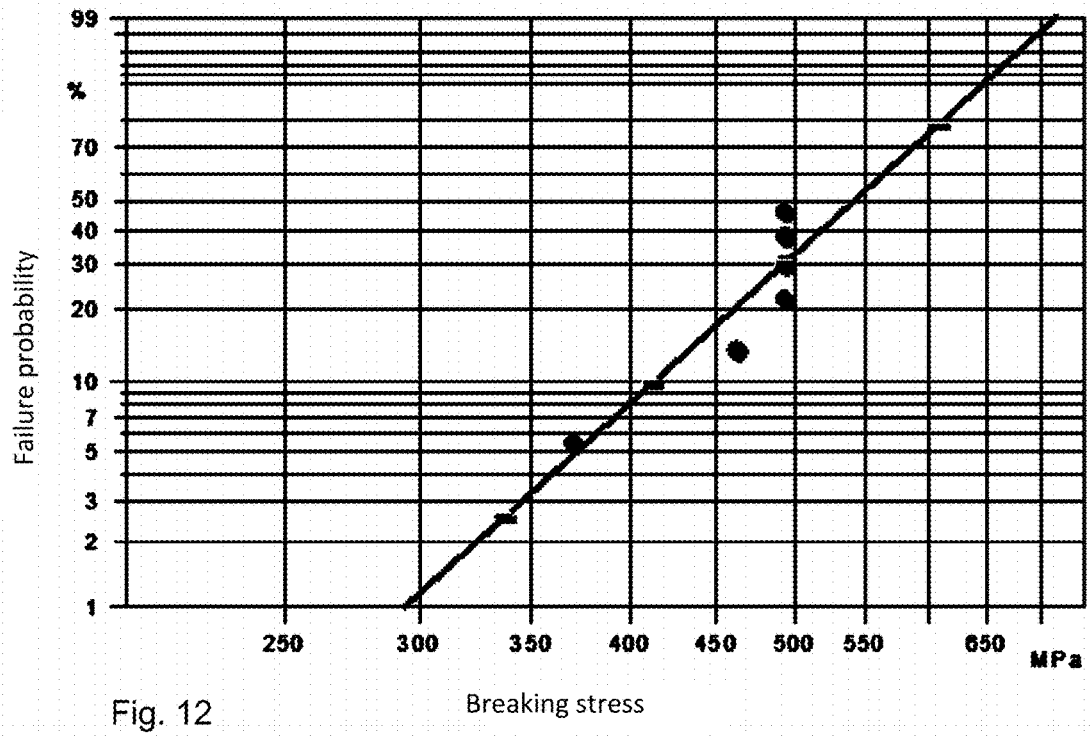

Finally, measurement point 32 is resulting from the regression line shown in FIG. 12, with a Weibull modulus of 6.9 and an average fracture strength of 572.7 MPa. These values were measured on samples with edges 7 processed according to the invention, similar to those shown in FIGS. 4 to 6.

Measurement points 30, 31, 32 prove that the laser cut edges and the edges processed according to the invention are resulting in higher strengths compared to edges cut by score-and-break separation. The strength of edges 7 processed according to the invention is even significantly higher than in the case of the laser cut edges.

Below, high-strength glasses are listed for which a control in strength can be achieved by monitoring the edge strength according to the invention.

According to one embodiment, glasses with the following components of molar composition, in mole percent, are suitable:

| Component | mol % |
| --- | --- |
| $SiO_2$ | 56-70 |
| $Al_2O_3$ | 10.5-16 |
| $B_2O_3$ | 0-3 |
| $P_2O_5$ | 0-3 |
| $Na_2O$ | 10-15 |
| $K_2O$ | 0-2 |
| MgO | 0-3 |
| ZnO | 0-3 |
| $TiO_2$ | 0-2.1 |
| $SnO_2$ | 0-1 |
| F | 0.001-5. |

Additionally, a secondary condition that applies is that the quotient of the molar content of fluorine to the molar content of $B_2O_3$, i.e. $F/B_2O_3$, is in a range from 0.0003 to 15, preferably from 0.0003 to 11, more preferably from 0.0003 to 10. These glasses can be chemically toughened and can be used in portable displays as cover glasses.

Preferably, the composition comprises the following components:

| Component | mol % |
| --- | --- |
| $SiO_2$ | 61-70 |
| $Al_2O_3$ | 11-14 |
| $B_2O_3$ | 0-0.5 |
| $Li_2O$ | 0-0.1 |
| $Na_2O$ | 11-15 |
| $K_2O$ | 0-2 |
| MgO | 0-3 |
| CaO | 0 (free) |
| ZnO | 0-1 |
| $CeO_2$ | 0-0.05 |
| $ZrO_2$ | 0 (free) |
| $SnO_2$ | 0-0.3 |
| F | 0.001-3 |
| $F/B_2O_3$ | 0.002-6. |

Particularly preferably, the composition comprises the following components:

| Component | mol % |
| --- | --- |
| $SiO_2$ | 64-70 |
| $Al_2O_3$ | 11-14 |
| $B_2O_3$ | 0-0.5 |
| $Li_2O$ | 0-0.1 |
| $Na_2O$ | 11-15 |
| $K_2O$ | 0-2 |
| MgO | 0-3 |
| CaO | 0 (free) |
| ZnO | <0.1 |
| $CeO_2$ | 0-0.05 |
| $ZrO_2$ | 0 (free) |
| $SnO_2$ | 0-0.3 |
| F | 0.001-1 |
| $F/B_2O_3$ | 0.002-2. |

Furthermore, preferably, according to another embodiment of the invention, borosilicate glasses of the following glass compositions are used, comprising (in wt.-%)

| | |
| --- | --- |
| $SiO_2$ | 60-85 |
| $Al_2O_3$ | 1-10 |
| $B_2O_3$ | 5-20 |
| $\Sigma\ Li_2O + Na_2O + K_2O$ | 2-16 |
| $\Sigma\ MgO + CaO + SrO + BaO + ZnO$ | 0-15 |
| $\Sigma\ TiO_2 + ZrO_2$ | 0-5 |
| $P_2O_5$ | 0-2, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt.-%, or for "black glass" from 0 to 15 wt.-%, and refining agents such as $As_2O_3$, $Sb_2O_3$, $SnO_2$, $SO_3$, Cl, F, $CeO_2$ from 0 to 2 wt.-%.

Yet another suitable group of glasses are alkali-free borosilicate glasses. In this case, the following composition is preferred, in percent by weight:

| Component | Wt.-% |
| --- | --- |
| $SiO_2$ | >58-65 |
| $Al_2O_3$ | >14-25 |
| $B_2O_3$ | >6-10.5 |
| MgO | 0-<3 |
| CaO | 0-9 |
| BaO | >3-8 |
| ZnO | 0-<2. |

These glasses are also described in US 2002/0032117 A1, and the contents thereof with respect to the glass compositions and glass properties is fully incorporated into the subject matter of the present application. A glass of this class is marketed by the Applicant under the tradename AF 32®.

The table below lists the contents of components of another suitable alkali-free borosilicate glass, and in the right column, based on this glass, a range of compositions of a class of glasses having similar properties:

| Component | Example (wt.-%) | Range (wt.-%) |
|---|---|---|
| $SiO_2$ | 70 | 67-73 |
| $Al_2O_3$ | 10 | 8-12 |
| $B_2O_3$ | 10 | 8-12 |
| CaO | 6 | 4-9 |
| BaO | 1 | 0.5-2 |
| SrO | 3 | 2-4. |

Yet another class of preferred types of glass are borosilicate glasses with the following components, in percent by weight:

| Component | Wt.-% |
|---|---|
| $SiO_2$ | 30-85 |
| $B_2O_3$ | 3-20 |
| $Al_2O_3$ | 0-15 |
| $Na_2O$ | 3-15 |
| $K_2O$ | 3-15 |
| ZnO | 0-12 |
| $TiO_2$ | 0.5-10 |
| CaO | 0-0.1. |

One glass of this class of glasses is Schott's glass D 263. The glasses are also described in US 2013/207058 A1, with more detailed compositions, and the contents thereof with respect to the compositions of the glasses and their properties is fully incorporated into the subject matter of the present application.

Soda-lime glasses are suitable as well. The table below lists two exemplary embodiments as well as the contents of components of a preferred composition range, in percent by weight:

| | Glass 1 | Glass 2 | Range |
|---|---|---|---|
| $SiO_2$ | 74.42 | 71.86 | 63-81 |
| $Al_2O_3$ | 0.75 | 0.08 | 0-2 |
| MgO | 0.30 | 5.64 | 0-6 |
| CaO | 11.27 | 9.23 | 7-14 |
| $Li_2O$ | 0.00 | 0.00 | 0-2 |
| $Na_2O$ | 12.90 | 13.13 | 9-15 |
| $K_2O$ | 0.19 | 0.02 | 0-1.5 |
| $Fe_2O_3$ | 0.01 | 0.04 | 0-0.6 |
| $Cr_2O_3$ | 0.00 | 0.00 | 0-0.2 |
| $MnO_2$ | 0.00 | 0.00 | 0-0.2 |
| $Co_3O_4$ | 0.00 | 0.00 | 0-0.1 |
| $TiO_2$ | 0.01 | 0.01 | 0-0.8 |
| $SO_3$ | 0.16 | 0.00 | 0-0.2 |
| Se | 0.00 | 0.00 | 0-0.1 |

Glass 2 is particularly well suitable for producing sheet glass in a float process.

Furthermore, according to one embodiment, soda-lime silicate glasses of the following compositions are used as the glass, comprising (in wt.-%):

| | |
|---|---|
| $SiO_2$ | 40-80 |
| $Al_2O_3$ | 0-6 |
| $B_2O_3$ | 0-5 |
| $\Sigma\ Li_2O + Na_2O + K_2O$ | 5-30 |
| $\Sigma\ MgO + CaO + SrO + BaO + ZnO$ | 5-30 |
| $\Sigma\ TiO_2 + ZrO_2$ | 0-7 |
| $P_2O_5$ | 0-2, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt.-%, or for "black glass" from 0 to 15 wt.-%, and refining agents such as $As_2O_3$, $Sb_2O_3$, $SnO_2$, $SO_3$, Cl, F, $CeO_2$ from 0 to 2 wt.-%.

According to yet another embodiment of the invention, lithium aluminosilicate glasses of the following compositions are used for the glass material, comprising (in wt.-%):

| | |
|---|---|
| $SiO_2$ | 55-69 |
| $Al_2O_3$ | 19-25 |
| $Li_2O$ | 3-5 |
| $\Sigma\ Na_2O + K_2O$ | 0-3 |
| $\Sigma\ MgO + CaO + SrO + BaO$ | 0-5 |
| ZnO | 0-4 |
| $TiO_2$ | 0-5 |
| $ZrO_2$ | 0-3 |
| $\Sigma\ TiO_2 + ZrO_2 + SnO_2$ | 2-6 |
| $P_2O_5$ | 0-8 |
| F | 0-1 |
| $B_2O_3$ | 0-2, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 1 wt.-%, and refining agents such as $As_2O_3$, $Sb_2O_3$, $SnO_2$, $SO_3$, Cl, F, $CeO_2$ from 0 to 2 wt.-%.

Furthermore, alkali-aluminosilicate glasses of the following glass compositions are preferably used as a support material, comprising (in wt.-%):

| | |
|---|---|
| $SiO_2$ | 40-75 |
| $Al_2O_3$ | 10-30 |
| $B_2O_3$ | 0-20 |
| $\Sigma\ Li_2O + Na_2O + K_2O$ | 4-30 |
| $\Sigma\ MgO + CaO + SrO + BaO + ZnO$ | 0-15 |
| $\Sigma\ TiO_2 + ZrO_2$ | 0-15 |
| $P_2O_5$ | 0-10, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt.-%, or for "black glass" from 0 to 15 wt.-%, and refining agents such as $As_2O_3$, $Sb_2O_3$, $SnO_2$, $SO_3$, Cl, F, $CeO_2$ from 0 to 2 wt.-%.

Moreover, alkali-free aluminosilicate glasses of the following glass compositions are also preferable used as a support material, comprising (in wt.-%):

| | |
|---|---|
| $SiO_2$ | 50-75 |
| $Al_2O_3$ | 7-25 |
| $B_2O_3$ | 0-20 |
| $\Sigma\ Li_2O + Na_2O + K_2O$ | 0-0.1 |
| $\Sigma\ MgO + CaO + SrO + BaO + ZnO$ | 5-25 |
| $\Sigma\ TiO_2 + ZrO_2$ | 0-10 |
| $P_2O_5$ | 0-5, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt.-%, or for "black glass" from 0 to 15 wt.-%, and refining agents such as $As_2O_3$, $Sb_2O_3$, $SnO_2$, $SO_3$, Cl, F, $CeO_2$ from 0 to 2 wt.-%.

Furthermore, low-alkali aluminosilicate glasses of the following glass compositions are also preferable used, comprising (in wt.-%):

| | |
|---|---|
| $SiO_2$ | 50-75 |
| $Al_2O_3$ | 7-25 |
| $B_2O_3$ | 0-20 |
| $\Sigma\ Li_2O + Na_2O + K_2O$ | 0-4 |
| $\Sigma\ MgO + CaO + SrO + BaO + ZnO$ | 5-25 |
| $\Sigma\ TiO_2 + ZrO_2$ | 0-10 |
| $P_2O_5$ | 0-5, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt.-%, or for "black glass" from 0 to 15 wt.-%, and refining agents such as $As_2O_3$, $Sb_2O_3$, $SnO_2$, $SO_3$, Cl, F, $CeO_2$ from 0 to 2 wt.-%.

Thin glasses that can be used include, for example, those marketed by Schott AG, Mainz, under the tradenames D263, D263 eco, B270, B270 eco, Borofloat, Xensation Cover, Xensation cover 3D, AF 45, AF 37, AF 32, and AF 32 eco.

According to another embodiment, the sheet glass element is a glass ceramic or comprises a glass ceramic sheet, and in this case the glass ceramic consists of a ceramized aluminosilicate glass or lithium aluminosilicate glass, in particular of a chemically and/or thermally toughened ceramized aluminosilicate glass or lithium aluminosilicate glass. In another embodiment, the hard and brittle material comprises a ceramizable initial glass which ceramizes or further ceramizes in case of fire under the influence of heat and thus provides increased fire safety.

Preferably, a glass ceramic or a ceramizable glass is used with the following composition of the initial glass (in wt.-%):

| | |
|---|---|
| $Li_2O$ | 3.2-5.0 |
| $Na_2O$ | 0-1.5 |
| $K_2O$ | 0-1.5 |
| $\Sigma\ Na_2O + K_2O$ | 0.2-2.0 |
| MgO | 0.1-2.2 |
| CaO | 0-1.5 |
| SrO | 0-1.5 |
| BaO | 0-2.5 |
| ZnO | 0-1.5 |
| $Al_2O_3$ | 19-25 |
| $SiO_2$ | 55-69 |
| $TiO_2$ | 1.0-5.0 |
| $ZrO_2$ | 1.0-2.5 |
| $SnO_2$ | 0-1.0 |
| $\Sigma\ TiO_2 + ZrO_2 + SnO_2$ | 2.5-5.0 |
| $P_2O_5$ | 0-3.0. |

In another embodiment, a glass ceramic or a ceramizable glass is preferably used with the following composition of the initial glass (in wt.-%):

| | |
|---|---|
| $Li_2O$ | 3-5 |
| $Na_2O$ | 0-1.5 |
| $K_2O$ | 0-1.5 |
| $\Sigma\ Na_2O + K_2O$ | 0.2-2 |
| MgO | 0.1-2.5 |
| CaO | 0-2 |
| SrO | 0-2 |
| BaO | 0-3 |
| ZnO | 0-1.5 |
| $Al_2O_3$ | 15-25 |
| $SiO_2$ | 50-75 |
| $TiO_2$ | 1-5 |
| $ZrO_2$ | 1-2.5 |
| $SnO_2$ | 0-1.0 |
| $\Sigma\ TiO_2 + ZrO_2 + SnO_2$ | 2.5-5 |
| $P_2O_5$ | 0-3.0. |

In another embodiment, a glass ceramic or a ceramizable glass is preferably used with the following composition of the initial glass (in wt.-%):

| | |
|---|---|
| $Li_2O$ | 3-4.5 |
| $Na_2O$ | 0-1.5 |
| $K_2O$ | 0-1.5 |
| $\Sigma\ Na_2O + K_2O$ | 0.2-2 |
| MgO | 0-2 |
| CaO | 0-1.5 |
| SrO | 0-1.5 |
| BaO | 0-2.5 |
| ZnO | 0-2.5 |
| $B_2O_3$ | 0-1 |
| $Al_2O_3$ | 19-25 |
| $SiO_2$ | 55-69 |
| $TiO_2$ | 1.4-2.7 |
| $ZrO_2$ | 1.3-2.5 |
| $SnO_2$ | 0-0.4 |
| $\Sigma\ TiO_2 + SnO_2$ | <2.7 |
| $P_2O_5$ | 0-3 |
| $\Sigma\ ZrO_2 + 0.87(TiO_2 + SnO_2)$ | 3.6-4.3. |

The glass ceramic preferably comprises high quartz mixed crystals or keatite mixed crystals as the predominant crystal phase. The crystallite size is preferably smaller than 70 nm, more preferably smaller than or equal to 50 nm, most preferably smaller than or equal to 10 nm.

A sheet glass element according to the invention is suitable, inter alia, for use as a thin film storage element, for example for rechargeable lithium-based thin film storage elements; as a support for electronic and/or optical components; as a layer material for composite materials; as an interposer element for spatial redistribution of electrical connections; as a cover glass of an electronic display, in particular a touch-sensitive screen; as part of a mobile phone or a television set; as a mirror substrate or an encapsulation, in particular for electronic components; as a starting product for structured elements in biological applications such as sequencing, as a biological filter, or as a cell growth base plate.

LIST OF REFERENCE NUMERALS

1 Sheet glass element
2 Surface of 1
3, 5 Faces of 1
7 Edge
9 Edge surface portion
11 Furrow
12 Abrasive tool
13 Grinding body
15 Surface portion adjacent to 9
16 Edge line
18 Surface area of 3, 5 with furrows
20 Tangent to 9
21 Tangent to 15
23 Angle between 20, 21

24 Arc
25 Starting point
26 Halfway point
27 End point
30-32 Measurement points for fracture strength and Weibull modulus

What is claimed is:

1. A sheet glass element comprising:
   two opposite parallel faces;
   an edge connecting the two faces;
   a thickness between the two faces of at most 700 μm, the edge having an edge surface portion that is convexly curved, so that at least one of the two faces merges into the edge surface portion, the edge surface portion having a curved arc with a length that is at least 1/30 of the thickness; and
   indentations in the edge surface portion, the indentations having a form of furrows with a length greater than a width and a depth thereof, the depth being at least 10 nm and at most 5 μm, wherein, due to the furrows, existing or emerging cracks will influence each other so that stress intensity at ends of the cracks is reduced.

2. The sheet glass element of claim 1, wherein the depth is at most 1 μm.

3. The sheet glass element of claim 1, wherein the edge surface portion has a radius of curvature which is at least 1/40 of the thickness, the radius of curvature being the radius of a circle fitted to the starting, halfway and end points of the curved arc.

4. The sheet glass element of claim 1, wherein, between the edge surface portion and an area of the face adjacent to the edge surface portion, an angle between tangents thereto are perpendicular to a curvature direction of the edge surface portion is at most 45°.

5. The sheet glass element of claim 4, wherein the angle is at most 10°.

6. The sheet glass element of claim 1, wherein the furrows intersect each other.

7. The sheet glass element of claim 6, wherein the furrows extend obliquely or perpendicularly to each other.

8. The sheet glass element of claim 1, wherein the furrows have a distribution of orientation that includes one or more preferred orientations.

9. The sheet glass element of claim 1, wherein the edge comprises two convexly curved edge surface portions, each one merging into a respective one of the two faces, wherein between the edge surface portions there is another surface portion of the edge that extends therebetween, which is rectilinear in cross section and which has a surface extending perpendicularly to the two faces.

10. The sheet glass element of claim 1, wherein the sheet glass element is configured for a use selected from the group consisting of a thin film storage element, a rechargeable lithium-based thin film storage element, a support for an electronic component, a support for an optical component, a layer material for a composite material, an interposer element for spatial redistribution of electrical connections, a cover glass of an electronic display, a cover glass for a touch-sensitive screen, a mobile phone part, a television set part, a mirror substrate, an encapsulation, a sequencing element, a biological filter, and a cell growth base plate.

11. The sheet glass element of claim 1, wherein the furrows have a depth of not more than 500 nm.

* * * * *